(12) United States Patent  
Park et al.

(10) Patent No.: US 10,872,727 B2  
(45) Date of Patent: *Dec. 22, 2020

(54) MULTILAYER CERAMIC CAPACITOR INCLUDING DIELECTRIC LAYERS HAVING IMPROVED RELIABILITY

(71) Applicant: SAMSUNG ELECTRO-MECHANICS CO., LTD., Suwon-si (KR)

(72) Inventors: Kum Jin Park, Suwon-si (KR); Kwang Hee Nam, Suwon-si (KR); Young Bin Jeong, Suwon-si (KR); Myung Woo Lee, Suwon-si (KR); Jong Han Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/279,188

(22) Filed: Feb. 19, 2019

(65) Prior Publication Data

US 2020/0051748 A1    Feb. 13, 2020

Related U.S. Application Data

(63) Continuation of application No. 16/169,926, filed on Oct. 24, 2018.

(30) Foreign Application Priority Data

Aug. 9, 2018    (KR) .................... 10-2018-0092878

(51) Int. Cl.
*H01G 4/12* (2006.01)
*H01G 4/30* (2006.01)
(Continued)

(52) U.S. Cl.
CPC .......... *H01G 4/1227* (2013.01); *H01G 4/012* (2013.01); *H01G 4/30* (2013.01); *H01G 4/12* (2013.01); *H01G 4/224* (2013.01)

(58) Field of Classification Search
CPC .......... H01G 4/12; H01G 4/005; H01G 4/308; H01G 4/224; H01G 4/30; H01G 4/1209; H01G 4/1227; H01G 4/012
See application file for complete search history.

(56) References Cited

U.S. PATENT DOCUMENTS 5,097,391 A * 3/1992 Nomura ............... H01G 4/1281  
                                                29/25.42  
5,319,517 A * 6/1994 Nomura ............... H01G 4/1245  
                                                361/321.4

(Continued)

FOREIGN PATENT DOCUMENTS

JP    2001-220224 A    8/2001  
JP    2001-307940 A    11/2001

(Continued)

OTHER PUBLICATIONS

Notice of Office Action dated Nov. 14, 2019 in Korean Patent Application No. 10-2018-0092878 (English Translation).

*Primary Examiner* — David M Sinclair  
(74) *Attorney, Agent, or Firm* — Morgan, Lewis & Bockius LLP

(57) ABSTRACT

A multilayer ceramic capacitor includes: a ceramic body including dielectric layers and first internal electrodes and second internal electrodes disposed to face each other with one of the dielectric layers interposed therebetween; and first and second external electrodes disposed on external surfaces of the ceramic body and electrically connected to the first and second internal electrodes, respectively. The dielectric layer includes dielectric grains, a grain boundary is present between at least two dielectric grains of the dielectric grains, (Continued)

and a Si/Ti mole ratio in the grain boundary satisfies 15% to 40%.

13 Claims, 4 Drawing Sheets

(51) Int. Cl.
*H01G 4/012* (2006.01)
*H01G 4/224* (2006.01)

(56) References Cited

U.S. PATENT DOCUMENTS

| | | | | |
|---|---|---|---|---|
| 5,879,812 | A * | 3/1999 | Nishiyama | H01G 4/1227 428/469 |
| 8,582,277 | B2 * | 11/2013 | Tanaka | H01G 4/1227 361/321.4 |
| 2002/0183190 | A1 * | 12/2002 | Masumura | B82Y 30/00 501/139 |
| 2003/0147194 | A1 * | 8/2003 | Hibi | B32B 18/00 361/118 |
| 2006/0088709 | A1 * | 4/2006 | Ito | C04B 35/4682 428/325 |
| 2015/0340156 | A1 * | 11/2015 | Masunari | H01G 4/2325 361/301.4 |
| 2016/0042866 | A1 * | 2/2016 | Yao | H01G 4/30 361/301.4 |
| 2017/0287636 | A1 * | 10/2017 | Sakurai | C04B 35/49 |
| 2018/0182549 | A1 * | 6/2018 | Koide | C04B 35/638 |

FOREIGN PATENT DOCUMENTS

| | | | |
|---|---|---|---|
| JP | 2007-063039 A | 3/2007 | |
| JP | 2007-201278 A | 8/2007 | |
| JP | 2009044017 A * | 2/2009 | ......... C04B 35/4682 |
| JP | 4663141 B2 * | 3/2011 | |
| JP | 2011-256091 A | 12/2011 | |
| JP | 2012-214334 A | 11/2012 | |

* cited by examiner

I-I'

MULTILAYER CERAMIC CAPACITOR INCLUDING DIELECTRIC LAYERS HAVING IMPROVED RELIABILITY

CROSS-REFERENCE TO RELATED APPLICATION(S)

This application is the continuation application of U.S. patent application Ser. No. 16/169,926 filed on Oct. 24, 2018, which claims benefit of priority to Korean Patent Application No. 10-2018-0092878 filed on Aug. 9, 2018 in the Korean Intellectual Property Office, the disclosure of which is incorporated herein by reference in its entirety.

TECHNICAL FIELD

The present disclosure relates to a multilayer ceramic capacitor capable of improving reliability.

BACKGROUND

In general, electronic components using a ceramic material, such as a capacitor, an inductor, a piezoelectric element, a varistor, a thermistor, or the like, include a ceramic body made of a ceramic material, internal electrodes formed in the ceramic body, and external electrodes mounted on a surface of the ceramic body so as to be connected to the internal electrodes.

Recently, in accordance with miniaturization and multi-functionalization of electronic products, chip components also tend to be miniaturized and multifunctionalized. As a result, there is a need to manufacture a small-sized and high capacitance multilayer ceramic capacitor.

As a method of simultaneously achieving miniaturization and high capacitance of the multilayer ceramic capacitor, a large number of dielectric layers and electrode layers in the multilayer ceramic capacitor may be stacked by reducing the thickness of the dielectric layers and the electrode layers. At present, the thickness of the dielectric layers is about 0.6 μm, and the dielectric layer has been continuously developed to have a thinner thickness.

According to the miniaturization of the multilayer ceramic capacitor as described above, dielectric breakdown in the dielectric layer of the thin film is accelerated, and it is difficult to ensure reliability.

In order to solve these problems, research into dielectric compositions has been undertaken, whereas research into composition and microstructure control for dielectric grain boundaries has not been sufficient.

The reason for which the dielectric grains in the dielectric layer of the thin film are deteriorated is that when oxygen vacancies formed in the dielectric grain move toward a negatively charged electrode (a − electrode) and accumulate at an interface of the negative electrode (the − electrode), activation energy of the grain boundary is lowered and tunneling occurs.

Reliability may be improved by increasing insulation resistance of the grain boundary in order to prevent deterioration of the dielectric grain and increase insulation resistance. Thus, research into grain boundaries is required.

SUMMARY

An aspect of the present disclosure may provide a multilayer ceramic capacitor capable of improving reliability.

According to an aspect of the present disclosure, a multilayer ceramic capacitor may include: a ceramic body including dielectric layers and first internal electrodes and second internal electrodes disposed to face each other with one of the dielectric layers interposed therebetween; and first and second external electrodes disposed on external surfaces of the ceramic body and electrically connected to the first and second internal electrodes, respectively. The dielectric layer may include dielectric grains, a grain boundary may be present between at least two dielectric grains of the dielectric grains, and a Si/Ti mole ratio in the grain boundary may satisfy 15% to 40%.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
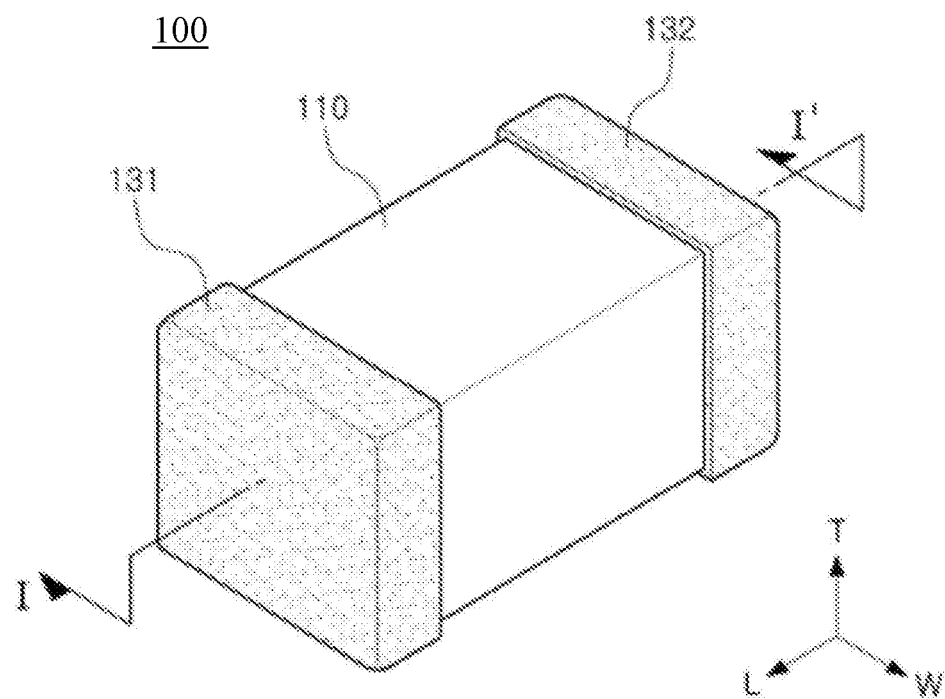
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
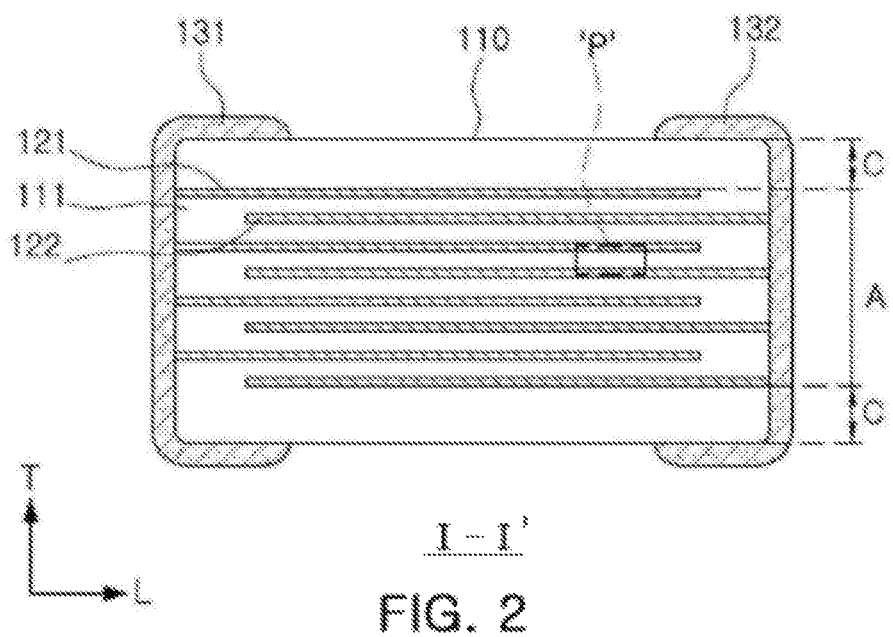
FIG. 2 is a cross-sectional view taken along line I-I' of FIG. 1.

FIG. 2 is a cross-sectional view taken along line I-I' of FIG. 1.

Figure 3:
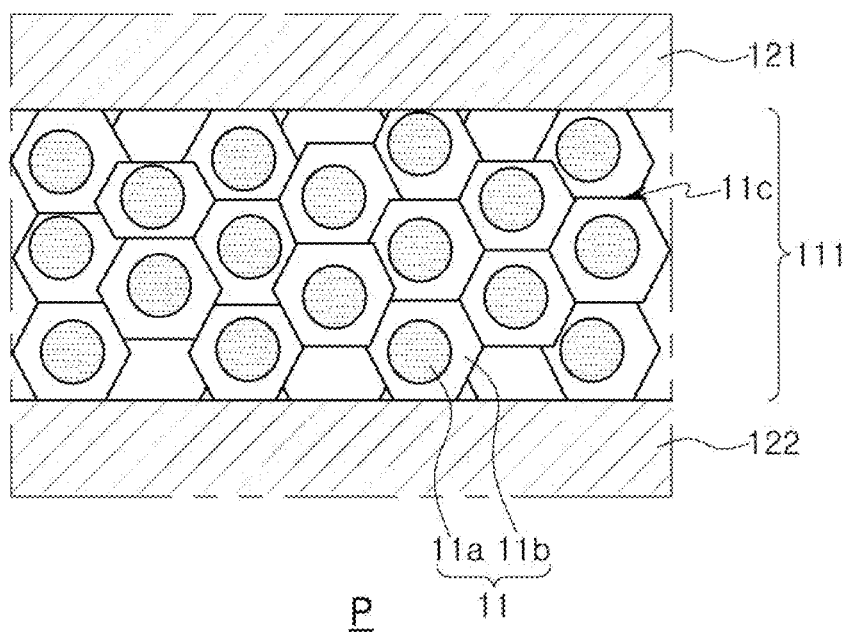
FIG. 3 is an enlarged view of a region P of FIG. 2.

FIG. 3 is an enlarged view of a region P of FIG. 2.

Referring to FIGS. 1 through 3, a multilayer ceramic capacitor 100 according to an exemplary embodiment in the present disclosure may include: a ceramic body 110 including dielectric layers 111 and first internal electrodes 121 and second internal electrodes 122 disposed to face each other with each of the dielectric layers 111 interposed therebetween; and first and second external electrodes 131 and 132 disposed on external surfaces of the ceramic body 110 and electrically connected to the first and second internal electrodes 121 and 122, respectively.

In the multilayer ceramic capacitor 100 according to an exemplary embodiment in the present disclosure, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' is the same as a direction in which dielectric layers are stacked, that is, a 'stacked direction'.

A shape of the ceramic body 110 is not particularly limited, but may be a hexahedral shape as illustrated.

One ends of a plurality of internal electrodes 121 and 122 formed in the ceramic body 110 may be exposed to one surface of the ceramic body 110 or the other surface opposing the one surface of the ceramic body 110.

The internal electrodes 121 and 122 may have a pair of a first internal electrode 121 and a second internal electrode 122 having different polarities.

One ends of the first internal electrodes 121 may be exposed to the one surface of the ceramic body, and one ends of the second internal electrodes 122 may be exposed to the other surface opposing the one surface thereof.

The first and second external electrodes 131 and 132 may be formed on one surface of the ceramic body 110 and the other surface opposing the one surface thereof, and may be electrically connected to the internal electrodes.

A material forming the first and second internal electrodes 121 and 122 is not particularly limited, but may be a conductive paste including one or more materials such as silver (Ag), lead (Pg), platinum (Pt), nickel (Ni), and copper (Cu).

The first and second external electrodes 131 and 132 may be electrically connected to the first and second internal electrodes 121 and 122 in order to form capacitance, and the second external electrode 132 may be connected to a potential different to a potential to which the first external electrode 131 is connected.

A conductive material contained in the first and second external electrodes 131 and 132 may be nickel (Ni), copper (Cu), or alloys thereof, but is not specifically limited thereto.

Each thickness of the first and second external electrodes 131 and 132 may be appropriately determined depending on usage thereof, or the like, for example, 10 µm to 50 µm, but is not specifically limited thereto.

According to an exemplary embodiment in the present disclosure, a raw material forming the dielectric layer 111 is not particularly limited as long as sufficient capacitance may be obtained. For example, the raw material of the dielectric layer 111 may be barium titanate ($BaTiO_3$) powder particles.

A material of the dielectric layer 111 may be prepared by adding various ceramic additives, organic solvents, plasticizers, binders, dispersing agents, and the like, to powder particles such as the barium titanate ($BaTiO_3$) powder particles, or the like, according to an object in the present disclosure.

The dielectric layers 111 are in a sintered state and may be integrated with each other so that boundaries between dielectric layers adjacent to each other are not readily apparent.

The internal electrodes 121 and 122 may be formed on the dielectric layer 111, and the internal electrodes 121 and 122 may be formed in the ceramic body by sintering, with each of the dielectric layers 111 interposed therebetween.

This ceramic body 110 may include an active portion A as a portion contributing to forming capacitance of the capacitor and upper and lower cover portions C formed on upper and lower parts of the active portion A, respectively, as upper and lower margin portions.

The active portion A may be formed by repeatedly stacking the plurality of first and second internal electrodes 121 and 122 with each of the dielectric layers 111 interposed therebetween.

The upper and lower cover portions C may be formed of the same material as that of the dielectric layer 111 and have the same configuration as that of the dielectric layer 111 except that they do not include the internal electrodes.

That is, the upper and lower cover portions C may include a ceramic material such as a barium titanate ($BaTiO_3$)-based ceramic material.

The upper and lower cover portions C may be formed by stacking a single dielectric layer or two or more dielectric layers on the upper and lower surfaces of the active portion A, respectively, in the thickness direction, and may basically serve to prevent damage to the internal electrodes due to physical or chemical stress.

A thickness of the dielectric layer 111 may be arbitrarily changed depending on capacitance design of a capacitor. In an exemplary embodiment in the present disclosure, a thickness of the dielectric layer after sintering may be 0.4 µm or less per 1 layer.

In addition, a thickness of each of the first and second internal electrodes 121 and 122 after sintering may be 0.4 µm or less per 1 layer.

Referring to FIG. 3, the dielectric layer 111 may include dielectric grains 11, a grain boundary 11c may be present between at least two dielectric grains of the dielectric grains 11, and a Si/Ti mole ratio in the grain boundary 11c may satisfy 15% to 40%.

The dielectric grains 11 may have a perovskite structure represented by $ABO_3$.

In the structure, A may include one or more selected from a group consisting of barium (Ba), strontium (Sr), lead (Pb), and calcium (Ca), but is not limited thereto.

In the structure, B is not particularly limited, and may be any material as long as it is a material capable of being located at a B site in the perovskite structure, and may include one or more selected from the group consisting of titanium (Ti) and zirconium (Zr).

The dielectric grain may include one or more selected from the group consisting of $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq b\ x \leq 0.10$, $0 < y \leq 0.20$), $Ba_m(Ti_{1-x}Zr_x)O_3$ ($0.995 \leq m \leq 1.010$, $x \leq 0.10$) or $Ba_mTiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$) in which one or more of rare earth elements are partially solid-dissolved. However, the dielectric grain is not limited thereto.

According to an exemplary embodiment in the present disclosure, the dielectric layer 111 may include a non-reducing dielectric composition, capable of being sintered in a reducing atmosphere. Hereinafter, each component of the dielectric composition forming the dielectric layer 111 including the dielectric grains 11 is described in more detail.

a) Base Material Powder

The dielectric composition may contain a base material powder represented by $BaTiO_3$.

According to an exemplary embodiment in the present disclosure, the base material powder may be represented by $BaTiO_3$, but is not limited thereto. For example, the base material powder may be represented by $(Ba_{1-x}Ca_x)(Ti_{1-y}Ca_y)O_3$, $(Ba_{1-x}Ca_x)(Ti_{1-y}Zr_y)O_3$, $Ba(Ti_{1-y}Zr_y)O_3$, or the like, formed by partially solid-dissolving Ca, Zr, and the like.

In other words, the base material powder may contain one or more selected from the group consisting of $BaTiO_3$, $(Ba_{1-x}Ca_x)(Ti_{1-y}Ca_y)O_3$ (wherein x satisfies $0 \leq x \leq 0.3$, and y satisfies $0 \leq y \leq 0.1$), $(Ba_{1-x}Ca_x)(Ti_{1-y}Zr_y)O_3$ (wherein x satisfies $0 \leq x \leq 0.3$, y satisfies $0 \leq y \leq 0.5$), and $Ba(Ti_{1-y}Zr_y)O_3$ (wherein $0 < y \leq 0.5$), but is not limited thereto.

The base material powder may have an average particle size of 40 nm or more and 150 nm or less, but is not specifically limited thereto.

b) First Accessory Component

According to an exemplary embodiment in the present disclosure, the dielectric ceramic composition may further contain an oxide or a carbonate containing at least one of Mn, V, Cr, Fe, Ni, Co, Cu and Zn, as a first accessory component.

As the first accessory component, the oxide or the carbonate containing at least one of Mn, V, Cr, Fe, Ni, Co, Cu and Zn may have a content of 0.05 to 2.0 mol % based on 100 mol % of the base material powder.

The first accessory component may serve to decrease a sintering temperature and improve a high-temperature withstand voltage property of a multilayer ceramic capacitor to which the dielectric ceramic composition is applied.

The content of the first accessory component and each content of second to sixth accessory component to be described below, which are included based on 100 mol % of the base material powder, may be defined by mol % of metal ions contained in each accessory component.

In the case in which a content of the first accessory component is less than 0.05 mol %, the sintering temperature may be high and the high-temperature withstand voltage properties may be slightly deteriorated.

In the case in which a content of the first accessory component is 2.0 mol % or more, the high-temperature withstand voltage property and a room temperature specific resistance may be deteriorated.

In particular, the dielectric ceramic composition according to an exemplary embodiment in the present disclosure may further contain the first accessory component having a content of 0.05 to 2.0 mol % based on 100 mol % of the base material powder, such that a low temperature sintering process may be performed and excellent high-temperature withstand voltage property may be obtained.

c) Second Accessory Component

According to an exemplary embodiment in the present disclosure, the dielectric ceramic composition may further contain a second accessory component, an oxide or a carbonate containing a fixed-valence acceptor element Mg.

The dielectric ceramic composition may further contain the second accessory component, an oxide or a carbonate containing a fixed-valence acceptor element Mg, having a content of 0.0 to 2.0 mol % based on 100 mol % of the base material powder.

The second accessory component, a fixed-valence acceptor element and compounds containing the same, may control a microstructure (inhibit abnormal grain growth) and impart reduction resistance in the dielectric ceramic composition.

When the content of the second accessory component is more than 2.0 mol % based on 100 mol % of the base material powder, it is not preferable since the dielectric constant may be lowered.

d) Third Accessory Component

According to an exemplary embodiment in the present disclosure, the dielectric ceramic composition may further contain a third accessory component, an oxide or a carbonate containing at least one of Y, Dy, Ho, Er, Gd, Ce, Nd, Pm, Eu, Tb, Tm, Yb, Lu and Sm.

The dielectric ceramic composition may further contain a third accessory component, an oxide or a carbonate containing at least one of Y, Dy, Ho, Er, Gd, Ce, Nd, Pm, Eu, Tb, Tm, Yb, Lu and Sm, having a content of 0.0 to 4.0 mol % based on 100 mol % of the base material powder.

The third accessory component may serve to prevent deteriorations in reliability of a multilayer ceramic capacitor to which the dielectric ceramic composition according to an exemplary embodiment in the present disclosure is applied.

When the content of the third accessory component is more than 4.0 mol %, reliability may be lowered, dielectric constant of the dielectric ceramic composition may be lowered, and high-temperature withstand voltage property may be deteriorated.

e) Fourth Accessory Component

According to an exemplary embodiment in the present disclosure, the dielectric ceramic composition may include a fourth accessory component, an oxide or a carbonate containing Ba.

The dielectric ceramic composition may contain the fourth accessory component, the an oxide or a carbonate containing Ba, having a content of 0.0 to 4.15 mol % based on 100 mol % of the base material powder.

The content of the fourth accessory component may be determined based on a content of the Ba element included in the fourth accessory component without classifying additional types such as the oxide or the carbonate.

The fourth accessory component may serve to promote sintering and control the dielectric constant in the dielectric ceramic composition. When the content of the fourth accessory component is more than 4.15 mol % based on 100 mol % of the base material powder, the dielectric constant may be lowered or a sintering temperature may increase.

f) Fifth Accessory Component

According to an exemplary embodiment in the present disclosure, the dielectric ceramic composition may contain a fifth accessory component including one or more selected from the group consisting of an oxide and a carbonate, of at least one element of Ca and Zr.

The dielectric ceramic composition may further contain the fifth accessory component, an oxide or a carbonate containing at least one of Ca and Zr, having a content of 0.0 to 20.0 mol % based on 100 mol % of the base material powder.

The content of the fifth accessory component may be determined based on a content of at least one element of Ca and Zr included in the fifth accessory component without classifying addition types such as the oxide or the carbonate.

The fifth accessory component may form a core-shell structure in the dielectric ceramic composition to improve the dielectric constant and promote reliability. In the case in which the fifth accessory component has a content of 20.0 mol % or less based on 100 mol % of the base material powder, a dielectric ceramic composition having a high dielectric constant and a good high-temperature withstand voltage property may be provided.

In the case in which the content of the fifth accessory component is more than 20.0 mol % based on 100 mol % of the base material powder, the room temperature dielectric constant may be lowered and the high-temperature withstand voltage property may be deteriorated.

g) Sixth Accessory Component

According to an exemplary embodiment in the present disclosure, the dielectric ceramic composition may further contain an oxide containing at least one of Si and Al or a glass compound containing Si, as a sixth accessory component.

The dielectric ceramic composition may further contain the sixth accessory component, an oxide containing at least one of Si and Al or a glass compound containing Si, having a content of 0.0 to 4.0 mol % based on 100 mol % of the base material powder.

The content of the sixth accessory component may be determined based on a content of at least one element of Si and Al included in the sixth accessory component without classifying addition types such as a glass, an oxide or a carbonate.

The sixth accessory component may serve to decrease a sintering temperature and improve a high-temperature withstand voltage property of a multilayer ceramic capacitor to which the dielectric ceramic composition is applied.

When the content of the sixth accessory component is more than 4 mol %, based on 100 mol % of the base material powder, it is not preferable since sinterability and a degree of density may decrease, and a secondary phase may be formed.

Recently, as electronic products are miniaturized and multifunctionalized, chip components also tend to be miniaturized and multifunctionalized. As a result, there is a need to manufacture a small-sized and high capacitance multilayer ceramic capacitor.

As a method of simultaneously achieving miniaturization and high capacitance of the multilayer ceramic capacitor, a large number of dielectric layers and electrode layers in the multilayer ceramic capacitor may be stacked by reducing the thickness of the dielectric layers and the electrode layers. At present, the thickness of the dielectric layers is about 0.6 μm, and the dielectric layer has been continuously developed to have a thinner thickness.

According to the miniaturization of the multilayer ceramic capacitor as described above, dielectric breakdown in the dielectric layer of the thin film is accelerated, and it is difficult to ensure reliability.

In order to solve these problems, researches on dielectric composition have been conducted, whereas research on composition and microstructure control for dielectric grain boundary has not been sufficient.

The reason in which the dielectric grains in the dielectric layer of the thin film are deteriorated is that when oxygen vacancies formed in the dielectric grain move toward a negative electrode (a − electrode) and accumulate at an interface of the negative electrode (the − electrode), activation energy of the grain boundary is lowered and tunneling occurs.

Reliability may be improved by increasing insulation resistance of the grain boundary in order to prevent deterioration of the dielectric grain and enhance the insulation resistance.

According to an exemplary embodiment in the present disclosure, the dielectric layer 111 may include dielectric grains 11, a grain boundary 11c may be present between at least two dielectric grains of the dielectric grains 11, and the Si/Ti mole ratio in the grain boundary 11c may satisfy 15% to 40%, such that the deterioration of the dielectric grain may be prevented and the insulation resistance of the grain boundary may be enhanced.

Thus, the reliability of the multilayer ceramic capacitor according to an exemplary embodiment in the present disclosure may be improved.

In other words, according to an exemplary embodiment in the present disclosure, as illustrated in FIG. 3, a size of the dielectric grain 11 in the dielectric layer 111 may be uniform, and the grain boundary 11c may be clearly observed.

A silicon (Si) concentration in the grain boundary 11c may be high. Specifically, according to an exemplary embodiment in the present disclosure, the Si/Ti mole ratio in the grain boundary 11c may satisfy 15% to 40%.

As a result, the insulation resistance of the dielectric grain boundary may be enhanced, thereby improving the reliability.

When the Si/Ti mole ratio in the grain boundary 11c is less than 15%, the Si concentration in the grain boundary 11c may be low, such that the insulation resistance may be lowered to reduce the reliability.

Meanwhile, when the Si/Ti mole ratio in the grain boundary 11c is more than 40%, the Si concentration in the grain boundary 11c may be excessively high, such that the dielectric constant may be lowered.

According to an exemplary embodiment in the present disclosure, the thickness of the grain boundary 11c may be 0.2 nm to 5 nm while the Si/Ti mole ratio in the grain boundary 11c may satisfy 15% to 40%.

Since the thickness of the grain boundary 11c satisfies 0.2 nm to 5 nm, the grain boundary 11c may be clearly identified in the dielectric layer 111, and the insulation resistance of the grain boundary 11c may be enhanced, thereby improving the reliability of the multilayer ceramic capacitor.

More preferably, the thickness of the grain boundary 11c may be 1.5 to 5 nm.

By forming the thickness of the grain boundary 11c to be thicker than that of the related art, the insulation resistance of the dielectric grain boundary 11c may be enhanced to improve the reliability.

When the thickness of the grain boundary 11c is thin, the insulation resistance may be lowered, such that the reliability may be deteriorated.

On the other hand, as the thickness of the grain boundary 11c is thick, the dielectric constant may be lowered.

According to an exemplary embodiment in the present disclosure, a multilayer ceramic capacitor 100 according to an exemplary embodiment in the present disclosure is an ultra-small and high-capacity product. The dielectric layer 111 may have a thickness of 0.4 μm or less, and the first and second electrodes 121 and 122 may have a thickness of 0.4 μm or less, but the thickness thereof is not necessarily limited thereto.

In other words, since the multilayer ceramic capacitor 100 according to an exemplary embodiment in the present disclosure is an ultra-small and high-capacity product, the thicknesses of the dielectric layer 111 and the first and second internal electrodes 121 and 122 are thin as compared to products according to the related art. Thus, in a multilayer ceramic capacitor in which thin dielectric layers and thin electrode layers are applied, an increase in a defect rate due to deterioration of insulation resistance of the dielectric layers becomes a problem.

That is, the dielectric layer and the internal electrode included the multilayer ceramic capacitor according to the related art have thicknesses relatively thicker than those of the dielectric layer and the internal electrode included in the multilayer ceramic capacitor according to the exemplary embodiment in the present disclosure, respectively. The thickness of the dielectric grain boundary and the Si concentration at the grain boundary are not significantly affected even though the thickness of the dielectric grain boundary and the Si concentration at the grain boundary are not adjusted as in the exemplary embodiment in the present disclosure.

However, in a product to which thin-film dielectric layers and internal electrodes having a thickness of 0.4 μm or less are applied as in the exemplary embodiment in the present disclosure, it is required to adjust the thickness of the dielectric grain boundary and the Si concentration in the grain boundary 11c as in the exemplary embodiment in the present disclosure.

That is, by adjusting the thickness of the dielectric grain boundary to satisfy 0.2 nm to 5 nm and adjusting the Si/Ti mole ratio in the grain boundary 11c to satisfy 15% to 40% as in the exemplary embodiment in the present disclosure, the insulation resistance of the dielectric grain boundary may be enhanced to improve reliability even in the case of the thin film in which the dielectric layer 111 and the first and second internal electrodes 121 and 122 have a thickness of 0.4 μm or less.

The thin film does not mean that the thickness of the dielectric layer 111 and the first and second internal electrodes 121 and 122 is 0.4 μm or less, and may include dielectric layers and internal electrodes having a thinner thickness than those of products according to the related art.

According to an exemplary embodiment in the present disclosure, the dielectric grains 11 may have a core-shell structure.

Referring to FIG. 3, the dielectric grain 11 may have a core 11a and a shell 11b surrounding the core 11a.

In the dielectric grain 11, the Si/Ti mole ratio may increase from the core 11a toward the shell 11b and the grain boundary 11c.

Specifically, the Si/Ti mole ratio in the core 11a may be less than 1%, and the Si/Ti mole ratio in the shell 11b may be less than 5% and greater than 1%, but the Si/Ti mole ratio thereof is not necessarily limited thereto.

In other words, in the dielectric grain 11, a region in which the Si/Ti mole ratio is less than 1% may be defined as the core 11a, and a region in which the Si/Ti mole ratio is less than 5% and greater than 1% may be defined as the shell 11b.

The ceramic body 110 may include an active portion A in which capacitance is formed by including the first and second internal electrodes 121 and 122 disposed to face each other with each of the dielectric layers 111 interposed therebetween, and cover portions C formed on upper and lower parts of the active portion A, respectively.

According to another exemplary embodiment in the present disclosure, the Si/Ti mole ratio of the grain boundary 11c of the dielectric grain 11 included in the cover portion C may be larger than the Si/Ti mole ratio of the grain boundary 11c of the dielectric grain 11 included in the active portion A.

By controlling the Si/Ti mole ratio of the grain boundary 11c of the dielectric grain 11 included in the cover portion C to be larger than the Si/Ti mole ratio of the grain boundary 11c of the dielectric grain 11 included in the active portion A, moisture resistance property as well as the reliability according to enhancement of the insulation resistance may be improved.

The Si/Ti mole ratio of the grain boundary 11c of the dielectric grain 11 included in the cover portion C may be 15% to 50%, but is not necessarily limited thereto.

When the Si/Ti mole ratio of the grain boundary 11c of the dielectric grain 11 included in the cover portion C is less than 15%, the insulation resistance may be lowered and moisture resistance reliability may be poor.

When the Si/Ti mole ratio of the grain boundary 11c of the dielectric grain 11 included in the cover portion C is more than 50%, the dielectric constant may be lowered.

Hereinafter, although the present disclosure is described in detail through Inventive Example and Comparative Example, this description is to help a specific understanding in the present disclosure, and a scope in the present disclosure is not limited to the following Inventive Examples.

Inventive Example

In Inventive Example in the present disclosure, a dielectric slurry was prepared by adding an additive such as Si, Mg, Mn, Dy, or the like, a binder, and an organic solvent such as ethanol, or the like, to dielectric material powder containing barium titanate ($BaTiO_3$) powder, followed by wet mixing, applying and drying the dielectric slurry on a carrier film to form a ceramic green sheet, thereby forming a dielectric layer.

Here, the additives of all elements relative to barium titanate were monodispersed and added in a size of 40% or less, and Si was monodispersed and added in a size of 10 nm or less.

The ceramic green sheet was manufactured by mixing ceramic powder, the binder, and a solvent to prepare the slurry, and forming the prepared slurry in a sheet shape having a thickness of several μm by a doctor blade method.

Then, a conductive paste for internal electrode containing 40 to 50 parts by weight of nickel powder in which a nickel grain had an average size of 0.1 to 0.2 μm was prepared.

The conductive paste for internal electrode was applied on the green sheet by a screen printing method to form internal electrodes, green sheets on which internal electrode patterns were disposed were stacked to form a laminate, and then the laminate was compressed and cut.

Thereafter, the cut laminate was heated to remove the binder, and then sintered in a high-temperature reducing atmosphere to form a ceramic body.

During the sintering, the ceramic body was sintered under reducing atmosphere (0.1% $H_2$/99.9% $N_2$, $H_2O$/$H_2$/$N_2$ atmosphere) at a temperature of 1100 to 1200° C. for 2 hours, and then subjected to reoxidation under nitrogen ($N_2$) atmosphere at a temperature of 1000° C. for 3 hours, thereby performing heat treatment.

Further, by lowering the temperature rapidly in a process of lowering a temperature, the size of the dielectric grains 11 in the dielectric layer 111 could be uniform, the thickness of the grain boundary 11c could satisfy 0.2 nm to 5 nm, and the Si/Ti mole ratio in the grain boundary 11c could satisfy 15% to 40%.

Next, the sintered ceramic body was subjected to a termination process with copper (Cu) paste, followed by an electrode sintering process, thereby forming external electrodes.

Further, the dielectric layer 111 and the first and second internal electrodes 121 and 122 in the ceramic body 110 were manufactured so that a thickness after sintering was 0.4 μm or less.

Comparative Example 1

Comparative Example 1 was performed in the same manner as in Inventive Example above, except that the ceramic body was slowly cooled at the time of lowering a temperature of the ceramic body in the sintering process.

Comparative Example 2

Comparative Example 2 was performed in the same manner as in Inventive Example above, except that the Si additive was used in a size of 50 nm, and the ceramic body was slowly cooled at the time of lowering a temperature of the ceramic body in the sintering process.

The dielectric constant, dielectric loss (DF), break-down voltage (BDV), insulation resistance (IR) defect rate, and humidity resistance load defect rate, and the like, were evaluated with respect to Inventive Example, and Comparative Examples 1 and 2 which were the prototype stacked ceramic capacitor (Prototype MLCC) specimens as completed above.

Room temperature capacitance and dielectric loss of the MLCC chip were measured under conditions of 1 kHz and AC 1.0 V/μm, using an LCR-meter.

The insulation resistance (IR) was measured after 60 seconds in a state in which DC 10 V/μm was applied to 10 samples.

The break-down voltage (BDV) was measured with a keithely meter. A voltage value at the moment when a current value became 10 mA after applying the voltage from 0 V to 1.00000 V in the sweep manner was measured as a BDV value.

Table 1 below shows the electrical characteristics of proto-type multilayer ceramic capacitors according to Experimental Examples (Inventive Examples and Comparative Examples).

TABLE 1

| | Si/Ti mole ratio | Dielectric Constant | DF (%) | BDV (V) | IR Defect rate (%) | Humidity Resistance Load Defect rate (%) |
|---|---|---|---|---|---|---|
| Inventive Example | 20% | 3723 | 5.0 | 64 | 0 | 0 |
| Comparative Example 1 | 12% | 3550 | 6.1 | 45 | 5 | 0 |
| Comparative Example 2 | 9% | 3662 | 7.2 | 33 | 25 | 16 |

The microstructure of the dielectric was observed by scanning electron microscopy (SEM) and transmission electron microscopy (TEM) images.

Figure 4:
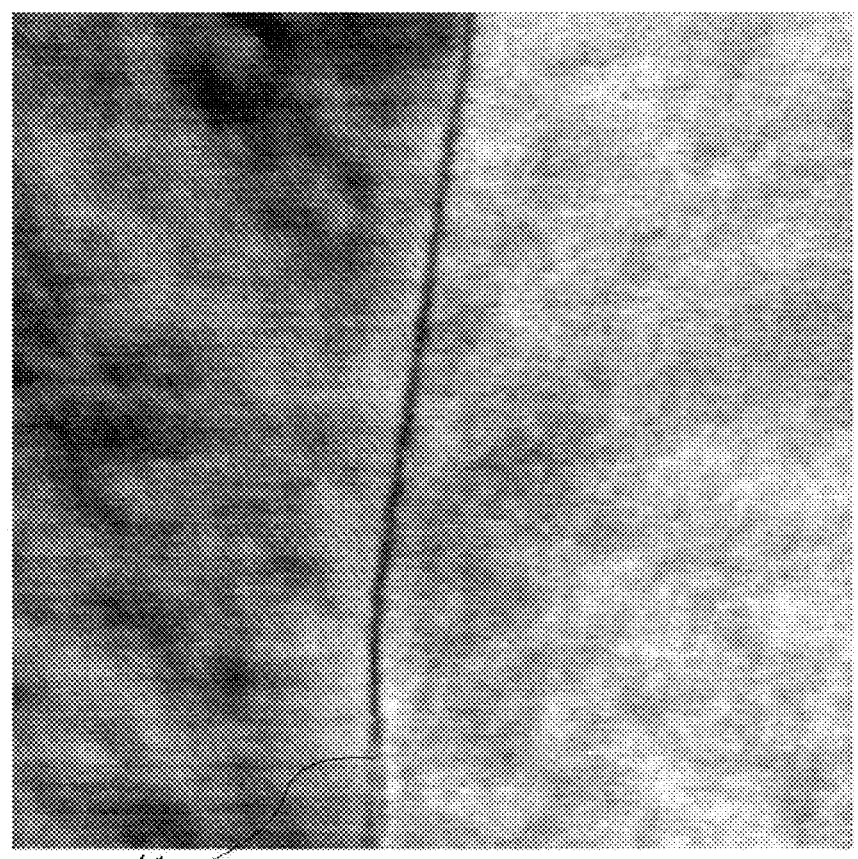
FIG. 4 is a transmission electron microscope (TEM) analysis image according to Comparative Example 1 in the present disclosure.

FIG. 4 is a transmission electron microscope (TEM) analysis image according to Comparative Example 1 in the present disclosure.

Figure 5:
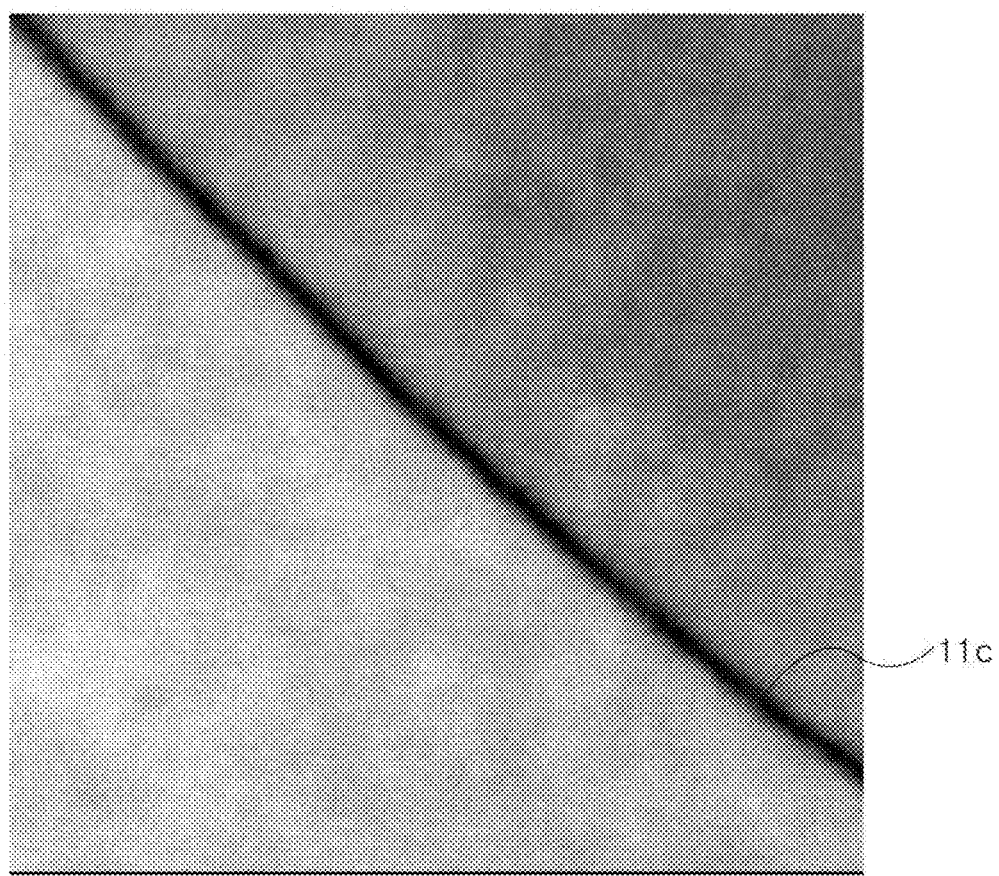
FIG. 5 is a transmission electron microscope (TEM) analysis image according to an Inventive Example in the present disclosure.

FIG. 5 is a transmission electron microscope (TEM) analysis image according to Inventive Example in the present disclosure.

Referring to FIG. 4, it could be appreciated that the grain boundary in the dielectric grain according to Comparative Example 1 in the present disclosure was distinguishable but thin, such that the insulation resistance was low.

On the other hand, referring to FIG. 5 having the same scale as FIG. 4, it can be appreciated that the grain boundary in the dielectric grain according to Inventive Example in the present disclosure was relatively and clearly distinguished, and also had a thick thickness.

It could be appreciated that according to Inventive Example in the present disclosure, since the grain boundary was relatively clearly distinguished, and also had a thick thickness, the insulation resistance was enhanced, such that the reliability was excellent.

Figure 6:
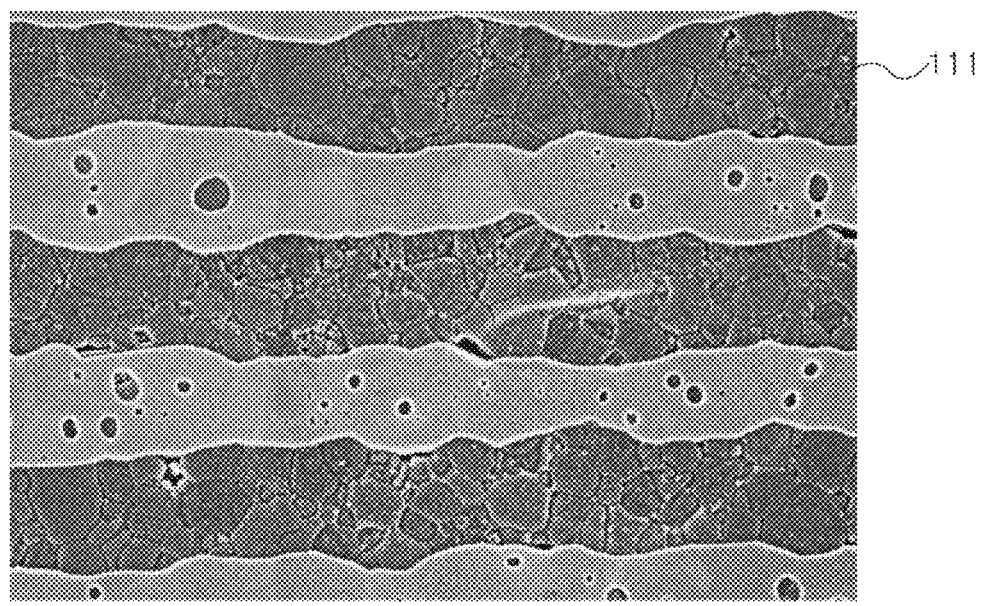
FIG. 6 is a scanning electron microscope (SEM) analysis image according to Inventive Example in the present disclosure.

FIG. 6 is a scanning electron microscope (SEM) analysis image according to Inventive Example in the present disclosure.

Figure 7:
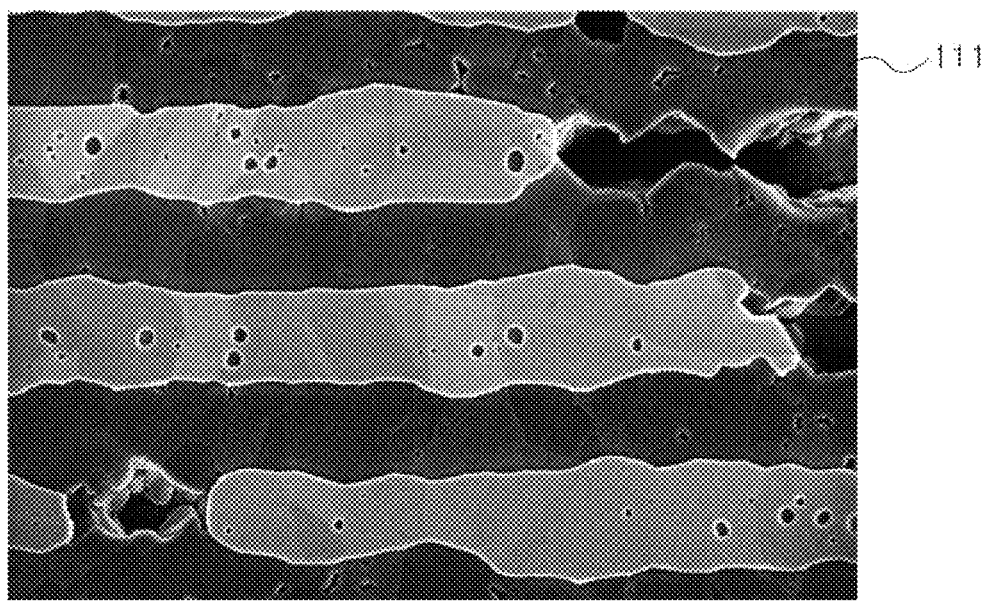
FIG. 7 is a scanning electron microscope (SEM) analysis image according to Comparative Example 1 in the present disclosure.

FIG. 7 is a scanning electron microscope (SEM) analysis image according to Comparative Example 1 in the present disclosure.

Referring to FIG. 6, it could be appreciated that the boundary of the dielectric grain was clearly observed in the microstructure inside the dielectric layer according to Inventive Example in the present disclosure.

On the other hand, referring to FIG. 7, it could be appreciated that the boundary of the dielectric grain was not clear in the microstructure inside the dielectric layer according to Comparative Example 1 in the present disclosure.

As set forth above, according to the exemplary embodiments in the present disclosure, in the dielectric grain included in the dielectric layer in the ceramic body, the insulation resistance of the dielectric grain boundary may be improved to thereby improve the reliability by controlling the composition and thickness of the dielectric grain boundary.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
    a ceramic body including dielectric layers including Ti and first internal electrodes and second internal electrodes disposed to face each other with one of the dielectric layers interposed therebetween; and
    first and second external electrodes disposed on external surfaces of the ceramic body and electrically connected to the first and second internal electrodes, respectively,
    wherein the dielectric layers include dielectric grains, and a grain boundary is present between at least two dielectric grains of the dielectric grains,
    wherein the dielectric layers include:
        a first accessory component containing an oxide or a carbonate containing at least one of Mn, V, Cr, Fe, Ni, Co, Cu or Zn, the first accessory component having a content of 0.05 to 2.0 mol % based on 100 mol % of Ti contained in the dielectric layers,
        a second accessory component containing an oxide or a carbonate containing Mg, the second accessory component having a content of 0.0 to 2.0 mol % based on 100 mol % of the Ti contained in the dielectric layers,
        a third accessory component containing an oxide or a carbonate containing at least one of Y, Dy, Ho, Er, Gd, Ce, Nd, Pm, Eu, Tb, Tm, Yb, Lu or Sm, the third accessory component having a content of 0.0 to 4.0 mol % based on 100 mol % of the Ti contained in the dielectric layers,
        a fourth accessory component containing an oxide or a carbonate containing Ba, the fourth accessory component having a content of 0.0 to 4.15 mol % based on 100 mol % of the Ti contained in the dielectric layers,
        a fifth accessory component containing an oxide or a carbonate containing at least one of Ca or Zr, the fifth accessory component having a content of 0.0 to 20.0 mol % based on 100 mol % of the Ti contained in the dielectric layers, and
        a sixth accessory component containing an oxide containing at least one of Si or Al, or a glass compound containing Si, the sixth accessory component having a content of 0.0 to 4.0 mol % based on 100 mol % of the Ti contained in the dielectric layers,
    a Si/Ti mole ratio in the grain boundary satisfies 15% to 40%, and
    wherein the first and second internal electrodes have a thickness of 0.4 μm or less.

2. The multilayer ceramic capacitor of claim 1, wherein the grain boundary has a thickness of 1.5 nm to 5 nm.

3. The multilayer ceramic capacitor of claim 2, wherein the dielectric layer has a thickness of 0.4 μm or less.

4. The multilayer ceramic capacitor of claim 1, wherein the dielectric grain has a core-shell structure.

5. The multilayer ceramic capacitor of claim 4, wherein the grain boundary has a thickness of 0.2 nm to 5 nm.

6. The multilayer ceramic capacitor of claim 4, wherein in the dielectric grain, the Si/Ti mole ratio increases from the core toward the shell and the grain boundary.

7. The multilayer ceramic capacitor of claim 4, wherein the Si/Ti mole ratio in the core is less than 1%.

8. The multilayer ceramic capacitor of claim 4, wherein the Si/Ti mole ratio in the shell is less than 5%.

9. The multilayer ceramic capacitor of claim 1, wherein the ceramic body includes an active portion including the first and second internal electrodes disposed to face each other with one of the dielectric layers interposed therebetween, and cover portions disposed on upper and lower parts of the active portion, respectively.

10. The multilayer ceramic capacitor of claim 9, wherein the Si/Ti mole ratio of the grain boundary of the dielectric grain included in the dielectric layers in the cover portions is higher than the Si/Ti mole ratio of the grain boundary of the dielectric grain included in the dielectric layers in the active portion.

11. The multilayer ceramic capacitor of claim 9, wherein the Si/Ti mole ratio of the grain boundary of the dielectric grain included in the dielectric layers in the cover portions is 15% to 50%.

12. The multilayer ceramic capacitor of claim 1, wherein the dielectric layer includes Si having a size of 10 nm or less.

13. The multilayer ceramic capacitor of claim 1, wherein the grain boundary has a thickness of 0.2 nm to 5 nm.

* * * * *